US012677360B2

(12) United States Patent
Polisi et al.

(10) Patent No.: US 12,677,360 B2
(45) Date of Patent: Jul. 7, 2026

(54) POWER SUPPLY CIRCUIT, RELATED SYSTEM AND METHOD

(71) Applicant: STMicroelectronics International N.V., Geneva (CH)

(72) Inventors: Vincenzo Polisi, Santa Maria di Licodia (IT); Donato Tagliavia, Acireale (IT); Calogero Andrea Trecarichi, Gela (IT); Mirko Dondini, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 13 days.

(21) Appl. No.: 18/828,728

(22) Filed: Sep. 9, 2024

(65) Prior Publication Data

US 2025/0089138 A1 Mar. 13, 2025

(30) Foreign Application Priority Data

Sep. 12, 2023 (IT) ........................ 102023000018681

(51) Int. Cl.
*H05B 45/345* (2020.01)
*H05B 45/46* (2020.01)

(52) U.S. Cl.
CPC ........... *H05B 45/345* (2020.01); *H05B 45/46* (2020.01)

(58) Field of Classification Search
CPC .............................. H05B 45/46; H05B 45/345
See application file for complete search history.

(56) References Cited

U.S. PATENT DOCUMENTS

| | | | | |
|---|---|---|---|---|
| 9,451,664 | B2 | 9/2016 | Jin et al. | |
| 10,893,591 | B2 | 1/2021 | Lee et al. | |
| 12,082,319 | B2 * | 9/2024 | Kanemitsu ........... | H05B 45/395 |
| 2013/0127344 | A1 * | 5/2013 | Jin ....................... | H05B 45/325 315/122 |
| 2014/0049370 | A1 * | 2/2014 | Eberwine ................ | H04L 63/18 340/5.61 |

(Continued)

OTHER PUBLICATIONS

Stmicroelectronics International N.V., "Ministero delle Imprese e del Made in Italy Opinione Scritta", IT202300018681, 8 pages, Mar. 6, 2024.

(Continued)

*Primary Examiner* — Alexander H Taningco
*Assistant Examiner* — Pedro C Fernandez
(74) *Attorney, Agent, or Firm* — Slater Matsil, LLP

(57) ABSTRACT

A power supply circuit includes a plurality of current supply circuits, each configured to provide an output current as a function of a respective digital control signal, and a measurement current proportional to the respective output current. A control circuit selects one of the measurement currents and one of the digital control signals associated with a current supply circuit. A comparison circuit generates a threshold current, and generates a comparison signal by comparing the selected measurement current with the threshold current. The control circuit sets, during a first phase, the threshold current to a first value smaller than an expected value for the selected measurement current as indicated by the selected digital control signal, and, during a second phase, to a second value greater than the expected value. The control circuit verifies whether the comparison signal is de-asserted during the first phase and asserted during the second phase.

20 Claims, 10 Drawing Sheets

(56) References Cited

U.S. PATENT DOCUMENTS

2016/0088697 A1* 3/2016 Yan ........................ H05B 45/10
315/307

OTHER PUBLICATIONS

STMicroelectronics, "L99LDLH32—32-Channel LED driver with automotive CAN FD Light interface"; Dec. 2021, DS12879 Rev. 5, pp. 1-141.

* cited by examiner

POWER SUPPLY CIRCUIT, RELATED SYSTEM AND METHOD

CROSS-REFERENCE TO RELATED APPLICATIONS

This application claims the benefit of Italian Patent Application No. 102023000018681, filed on Sep. 12, 2023, entitled "Power supply circuit, related system and method," which is hereby incorporated herein by reference to the maximum extent allowable by law.

TECHNICAL FIELD

Embodiments of the present description refer to power supply circuits and methods, such as power supply circuits configured to supply lighting modules, and associated methods.

BACKGROUND

FIG. 1 shows a typical lighting system. The lighting system includes a power supply circuit 1 and one or more lighting modules 20, such as lighting modules 201 to 20*k*. For example, the lighting modules 20 may form a LED or OLED panel 2.

In the example considered, each lighting module 20 includes one or more lighting sources. For example, in the example considered, each lighting module 20 including at least one LED (Light Emitting Diode) or OLED (organic light-emitting diode) L. For example, often each lighting module 20 includes a LED string, i.e., a plurality of LEDs connected in series, as schematically shown via two LEDs L1 and L2 connected in series.

The person skilled in the art will appreciate that a LED (or a LED chain) is usually not supplied with a constant voltage but rather via a current. Accordingly, in order to individually control the light intensity of each lighting module 20, the power supply circuit 1 usually comprises for each lighting module 20 a respective output terminal or channel OUT, such as output terminals OUT1 to OUTk, and the power supply circuit 1 is configured to provide to each output terminal OUT a respective current, such as currents $i_1$ to $i_k$.

Such power supply circuits 1 are well-known in the art. For example, the applicant of the present patent application sells LED driver integrated circuits, such as the L99LDLH32 having 32 channels. For example, the operation of the L99LDLH32 is described in the datasheet DS12879, "L99LDLH32-32-channel LED driver with automotive CAN FD Light interface," e.g., revision 5 of 2021.

In many applications, the power supply circuit 1 should be able to monitor each of the currents $i_1$ to $i_k$. For example, such a monitoring may be useful in order to verify whether each current provided by the power supply circuit 1 corresponds to an expected value or more generally is within an expected tolerance range, which, e.g., permits determining whether the intensity of the light emitted by a lighting module 20 correspond to an expected value and/or whether a lighting module represents a malfunction, e.g., due to a short-circuit or open-load condition.

SUMMARY

Considering the foregoing, an object of various embodiments of the present disclosure is to provide solutions for verifying the current supply conditions of a power supply circuit.

According to one or more embodiments, the above object is achieved by a power supply circuit having the distinctive elements set forth specifically in the ensuing claims. The embodiments moreover concern a related system and method.

The claims form an integral part of the technical teaching of the description provided herein.

As mentioned before, various embodiments of the present disclosure relate to a power supply circuit. In various embodiments, the power supply circuit comprises a plurality of output terminals, such as pads or pins of a respective integrated circuit comprising the power supply circuit, and for each output terminal a respective current supply circuit. Specifically, each current supply circuit is configured to provide an output current to the respective output terminal as a function of a respective first digital control signal.

For example, in various embodiments, each current supply circuit comprises a current digital-to-analog converter configured to receive a first reference current and the respective first digital control signal, wherein the first digital control signal is indicative of a first multiplier, and the current digital-to-analog converter is configured to generate a first current by multiplying the first reference current with the first multiplier. Moreover, each current supply circuit comprises a scaling circuit configured to generate the output current by generating an amplified version of the first current according to a first scaling factor.

For example, in various embodiments each current supply circuit comprises a first resistance connected between a regulated voltage and an output of the current digital-to-analog converter, a second resistance connected with the current path of the first FET between the regulated voltage and the respective output terminal, and an operational amplifier configured to drive the gate-source voltage of the first FET such that the voltage-drop at the second resistance corresponds to the voltage-drop at the first resistance. Accordingly, in this case, the ratio between the resistance value of the second resistance and the resistance value of the first resistance defines the first scaling factor.

In various embodiments, each current supply circuit comprises also a current sensor configured to provide a measurement current being proportional to the respective output current. For example, in various embodiments, the current sensor comprises a third resistance connected in series with the current path of a second FET to the regulated voltage, wherein the gate terminal of the second FET is connected to the gate terminal of the first FET. Accordingly, the resistance value of the third resistance and the scaling of the second FET with respect to the first FET define a second scaling factor. Preferably, the ratio between the first scaling factor and the second scaling factor is one.

Accordingly, in various embodiments, the current supply circuit comprises a first FET connected between the regulated voltage and the respective output terminal, and the current sensor comprises a second FET configured to provide the measurement current, wherein the current supply circuit is configured such that the gate-source voltage of the second FET corresponds to the gate-source voltage of the first FET.

In various embodiments, the power supply circuit comprises a first multiplexer circuit, a second multiplexer circuit, a comparison circuit and a control circuit. Specifically, the first multiplexer circuit is configured to provide a selected measurement current by selecting one of the measurement currents as a function of a selection signal indicating a selected current supply circuit. Conversely, the second multiplexer circuit is configured to provide a selected digital control signal by selecting one of the first digital control signals as a function of the selection signal indicating a selected current supply circuit.

In various embodiments, the comparison circuit is configured to generate a threshold current as a function of one or more digital threshold control signals. For example, in various embodiments, the one or more digital threshold control signals comprise a second digital control signal, and the comparison circuit comprises a further current digital-to-analog converter configured to receive a second reference current and the second digital control signal, wherein the second digital control signal is indicative of a second multiplier, and the further current digital-to-analog converter is configured to generate the threshold current by multiplying the second reference current with the second multiplier.

Moreover, in various embodiments the comparison circuit is configured to compare the selected measurement current with the threshold current. Specifically, in response to determining that the selected measurement current is greater than the threshold current, the comparison circuit de-asserts a comparison signal and, in response to determining that the selected measurement current is smaller than the threshold current, the comparison circuit assert the comparison signal.

For example, for this purpose, the comparison circuit may comprise a summation node configured to provide a current corresponding to the difference between the selected measurement current and the threshold current, and a current comparator configured to de-assert the comparison signal when current is greater than zero, and assert the comparison signal when the current is smaller than zero. Alternatively, the comparison circuit may comprise a first measurement resistance configured to be transversed by the threshold current and a second measurement resistance configured to be transversed by the selected measurement current. In this case, the comparison circuit may comprise a voltage comparator configured to assert the comparison signal when the voltage-drop at the first measurement resistance is greater than the voltage-drop at the second measurement resistance, and de-assert the comparison signal when the voltage-drop at the first measurement resistance is smaller than the voltage-drop at the second measurement resistance.

In various embodiments, the control circuit is configured to repeat various operations periodically. Specifically, the control circuit generates the selection signal in order to select a measurement current and a first digital control signal associated with a given current supply circuit. For example, the control circuit may sequentially select all or a subset of the current supply circuits. Next, the control circuit generates the one or more digital threshold control signals as a function of the selected digital control signal in order to set the threshold current during a first phase to a first value, wherein the first value is smaller than an expected value for the selected measurement current as indicated by the selected digital control signal. Moreover, the control circuit sets the threshold current during a second phase to a second value, wherein the second value is greater than the expected value for the selected measurement current as indicated by the selected digital control signal.

Accordingly, in various embodiments, the first value and the second value may be used to define a tolerance range for the expected value for the selected measurement current. For example, in various embodiments, the control circuit is configured to, during the first phase, set the second digital control signal to a first value being smaller than the selected digital control signal by a given first percentage and, during the second phase, set the second digital control signal to a second value being greater than the selected digital control signal by a given second percentage. Alternatively, the one or more digital threshold control signals may also comprise a reference current selection signal, and the control circuit may, during the first phase, set the second digital control signal to the value of the selected digital control signal and select via the reference current selection signal as the second reference current a current having a value being smaller than the first reference current by a given first percentage and, during the second phase, set the second digital control signal to the value of the selected digital control signal and select via the reference current selection signal as the second reference current a current having a value being greater than the first reference current by a given second tolerance percentage.

In various embodiments, the control circuit verifies then whether the comparison signal is de-asserted during the first phase and asserted during the second phase. Specifically, the control circuit asserts a status signal when the comparison signal is de-asserted during the first phase and asserted during the second phase, and de-asserts the status signal when the comparison signal is asserted during the first phase or de-asserted during the second phase.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The references used herein are for convenience only and do not interpret the scope or meaning of the embodiments.

Figure 1:
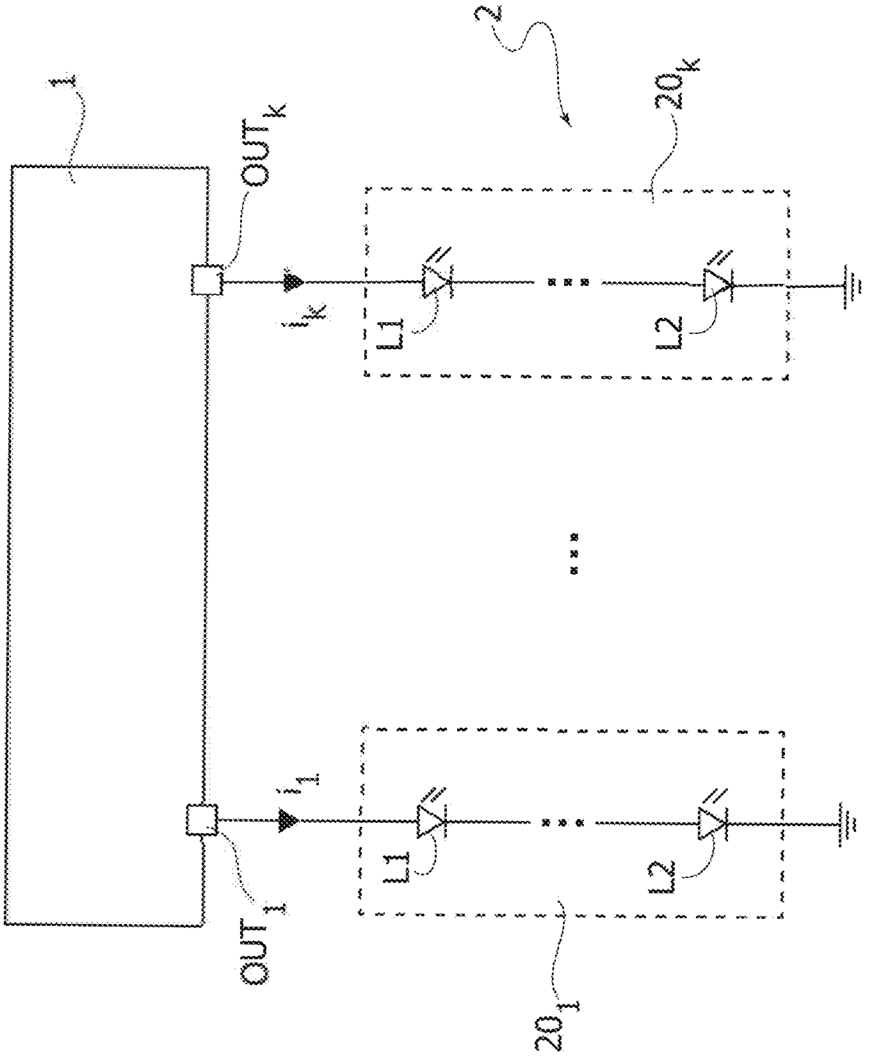
FIG. 1 PRIOR ART
FIG. 1 shows an example of a lighting system.

In the following FIGS. 2 to 11 parts, elements or components which have already been described with reference to FIG. 1 are denoted by the same references previously used in such Figure; the description of such previously described elements will not be repeated in the following in order not to overburden the present detailed description.

Figure 2:
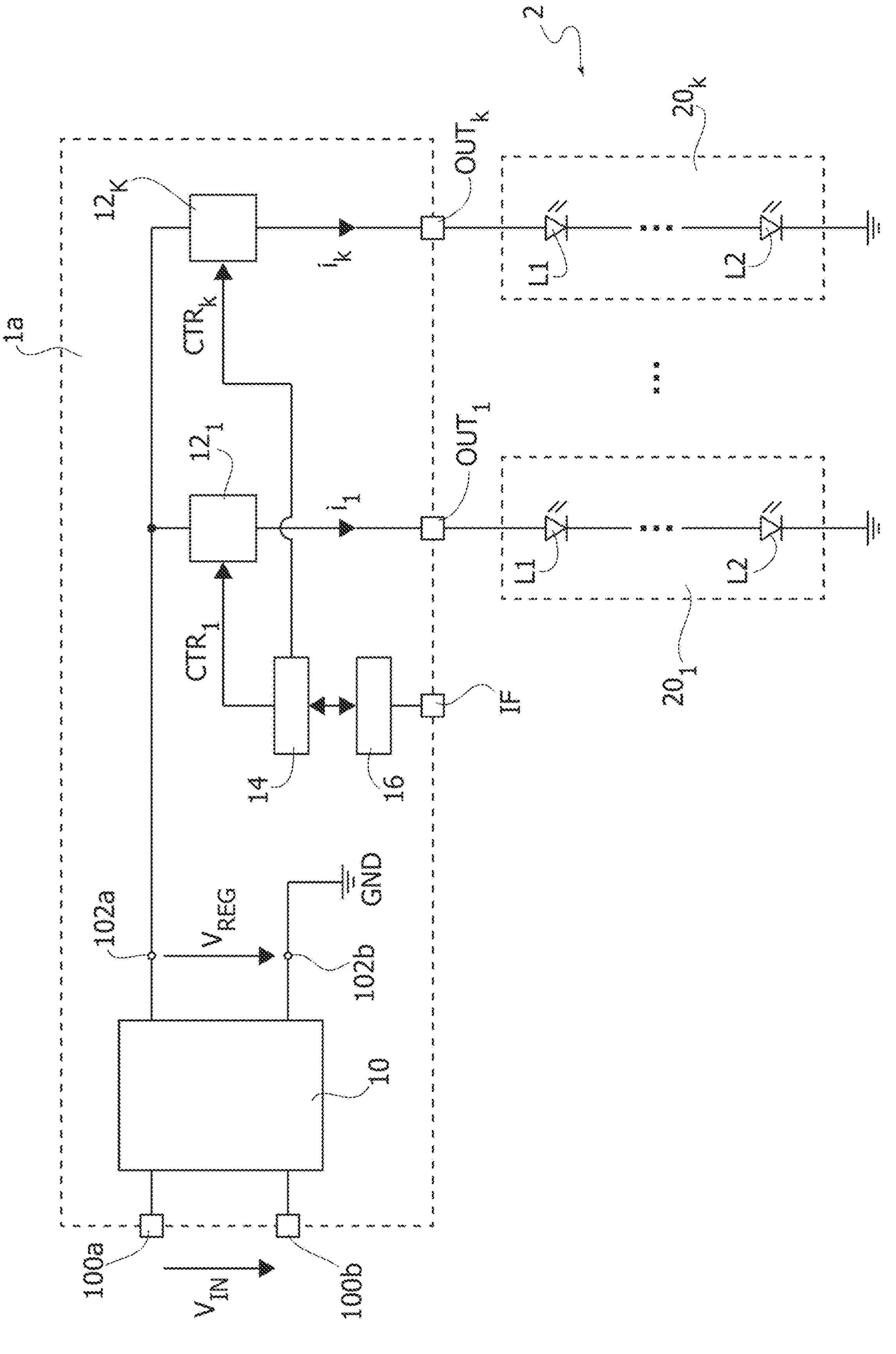
FIG. 2 shows an embodiment of a power supply circuit.

FIG. 2 shows an embodiment of a power supply circuit 1*a* according to the present disclosure. In various embodiments, the power supply circuit 1*a* may be implemented within an integrated circuit (IC).

Specifically, in the embodiment considered, the power supply circuit 1*a* comprises a plurality of output terminals OUT (e.g., pads of a die of the IC of the power supply circuit 1*a* or pins of a packaged IC of the power supply circuit 1*a*), such as k output terminals OUT1 to OUTk. In various embodiments, the power supply circuit 1*a* may be used in a lighting system, wherein one or more lighting modules 20, such as k lighting modules 201 to 20*k*, are connected to the output terminals OUT. In general, the number of lighting modules 20 connected to the power supply circuit 1*a* may correspond to the number k of output terminals OUT or may be smaller than the number k of output terminals OUT. For example, the number of output terminals, i.e., the channels, may be greater than 4, e.g., between 8 and 256. In various embodiments, each lighting module 20 includes one or more lighting sources, such as LEDs or OLEDs, or other solid state light sources, such as laser diodes. In general, the power supply circuit 1*a* may also be used to supply other types of loads.

As described in the foregoing, in various embodiments, the power supply circuit 1*a* is configured to provide to each output terminal OUT a respective current, such as currents $i_l$ to $i_k$. Specifically, in the embodiment considered, the power supply circuit 1*a* comprises for each output terminal OUT a respective current supply circuit 12, such as current supply circuits 121 to 12*k*, wherein each current supply circuit 12 is configured to provide a respective current.

In the embodiment considered, the current supply circuits 12 are supplied via a common DC voltage $V_{REG}$ applied between two nodes 102*a* and 102*b*, wherein the node 102*b* often represents a ground GND. Accordingly, in the example considered, each lighting module 20 and the respective current supply circuit 12 may thus be connected between the node 102*a* and the node 102*b*. In various embodiments, each current supply circuit 12 may be supplied by a respective voltage $V_{REG}$ or sub-sets of the current supply circuits 12 may be supplied by a respective voltage $V_{REG}$. For example, the voltage $V_{REG}$ may be in a range between 5 V and 24 V, e.g., between 9 V and 14 V. However, the voltage $V_{REG}$ may also be greater than 24 V, e.g., in a range between 50 V and 100 V.

In various embodiments, the voltage(s) $V_{REG}$ may be received via input terminals of the power supply circuit 1*a*, such as two input terminals 100*a* and 100*b* (e.g., pads or pins of a respective IC). Alternatively, as shown in FIG. 2, the power supply circuit 1*a* may comprise a voltage generator circuit 10 configured to generate the voltage(s) $V_{REG}$. In this case, the power supply circuit 1*a* may be configured to receive via the input terminals 100*a* and 100*b* an input voltage $V_{IN}$ and the voltage generator circuit 10 may be configured to generate the voltage(s) $V_{REG}$, e.g., generate a regulated voltage $V_{REG}$ at the nodes 102*a* and 102*b*, based on the voltage $V_{IN}$. In general, the input voltage $V_{IN}$ may be an AC or DC voltage. For example, in various embodiments, the terminals 100*a* and 100*b* may be connected to the mains, an external electronic converter generating a DC voltage or a battery. Accordingly, in various embodiments, the voltage generator circuit 10 may comprise a linear regulator, or an AC/DC or DC/DC electronic converter (switched mode power supply). For example, in various embodiments, the voltage generator circuit 10 is implemented with a DC/DC electronic converter, such as a buck or multi-phase buck converter, a boost converter, a SEPIC converter, or another type of electronic converter. In this case, the reactive components (inductances, such as inductors and/or transformers, and/or capacitors) of such an electronic converter may be external with respect to the IC of the power supply circuit 1*a*.

In the embodiment considered, each current supply circuit 12 is configured to generate the respective current as a function of one or more respective control signals CTR, such as control signal(s) $CTR_1$ for the current supply circuit 12, and control signal(s) $CTR_k$ for the current supply circuit 12*k*. In various embodiments, the power supply circuit 1*a* may comprise terminals for receiving the control signals CTR, e.g., from an external microprocessor. Conversely, in other embodiments, as shown in FIG. 2, the power supply circuit 1*a* comprises a control circuit 14 configured to generate the control signals CTR.

For example, in various embodiments, the power supply circuit 1*a* comprises a communication interface 16, such as a serial communication interface, e.g., a Universal asynchronous receiver/transmitter (UART), Serial Peripheral Interface Bus (SPI), Inter-Integrated Circuit (I2C), Controller Area Network (CAN) bus, and/or Ethernet interface, which is connected to one or more terminals IF of the power supply circuit 1*a*. Accordingly, in the embodiment considered, the control circuit 14 may be configured to receive via the communication interface 16 data being indicative of requested values of the currents to be provided by the current supply circuits 12, and the control circuit 14 may generate the control signals CTR accordingly. In various embodiments, the control circuit 14 may also be connected to one or more sensors in order to generate the control signals CTR, such as one or more current sensors configured to monitor the currents generated via the current supply circuits 12, and/or the voltage $V_{REG}$ and/or the temperature of the power supply circuit 1*a*.

Figure 3:
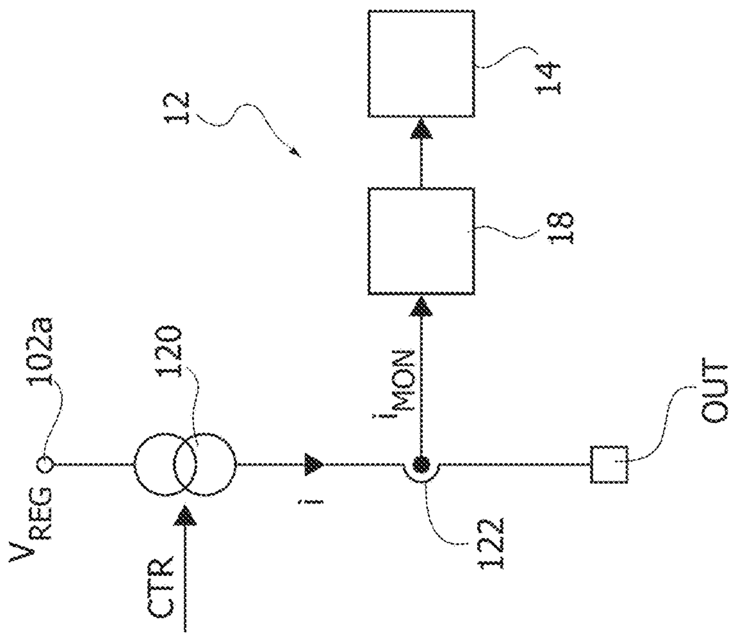
FIG. 3 shows an embodiment of a current supply circuit of the power supply circuit of FIG. 2.

FIG. 3 shows an embodiment of current supply circuit 12. In the embodiment considered, the current supply circuit 12 comprises a variable current source 120 connected between the voltage $V_{REG}$ (or the respective voltage $V_{REG}$) and the respective output terminal OUT, wherein the variable current source 120 is configured to provide to the output terminal OUT a current, indicated in FIG. 3 as current i. Specifically, in various embodiments, the variable current source 120 is configured to set the value/amplitude of the current i as a function of the control signals CTR.

As mentioned before, various embodiments of the present disclosure relate to solutions for monitoring the currents $i_l$ to $i_k$ provided by the power supply circuit 1*a*. For example, in the embodiment considered, the power supply circuit 1*a* comprises a current monitoring circuit 18 and each current supply circuit 12 comprises a current sensor 122 configured to provide a current $i_{MON}$ to the current monitoring circuit 18, wherein the current $i_{MON}$ is proportional to the current i provided by the respective current supply circuit 12. For example, as will be described in greater detail in the following, the current monitoring circuit 18 may determine whether the current i, or more specifically the monitored current $i_{MON}$, is between a lower threshold and an upper threshold.

In general, as well-known to those of skill in the art, the intensity of the light emitted by a LED may be varied by varying the average current flowing through the LED. In this respect, the average current flowing through a lighting module 20 may be varied by varying the amplitude of the current i (usually identified as constant current or CC dimming) and/or via a Pulse-Width Modulation (PWM) of the current (usually identified as PWM dimming). Thus, while not shown in the figures, the power supply circuit 1*a* may also be configured to modulate each current $i_l$ to $i_k$ via a respective PWM modulation, and/or modulate all currents $i_l$ to $i_k$ via a common PWM modulation. For example, in the former case, the variable current source 120 of each current supply circuit 12 may be switched on and off via a respective further control signal CTR corresponding to a PWM signal, thereby implementing an individual PWM modulation of the current i provided to the respective lighting module 20. Conversely, in the latter case, the power supply circuit 1*a* may comprise an electronic switch configured to selectively connect the current supply circuits 12 and the lighting sources 20 to the voltage $V_{REG}$. For example, in various embodiments, the lighting modules 20 may be connected via a common electronic switch to ground GND and the electronic switch is closed and opened via a further control signal CTR corresponding to a PWM signal, thereby implementing a common PWM dimming of all lighting modules 20, whereby the relative light intensity of the lighting modules may be set via the individual CC dimming via the current generator 120 (i.e., the amplitude of the currents i, to ix during the switch-on periods of the PWM modulation) and optionally the additional individual PWM dimming. Generally, such a PWM dimming of the currents $i_l$ to $i_k$ will not be considered specifically in the following, because it is sufficient that the current monitoring circuit 18 is configured to monitor each current $i_l$ to $i_k$ when the respective channel is enabled, i.e., during the switch-on periods of the optional PWM modulation(s).

Figure 4:
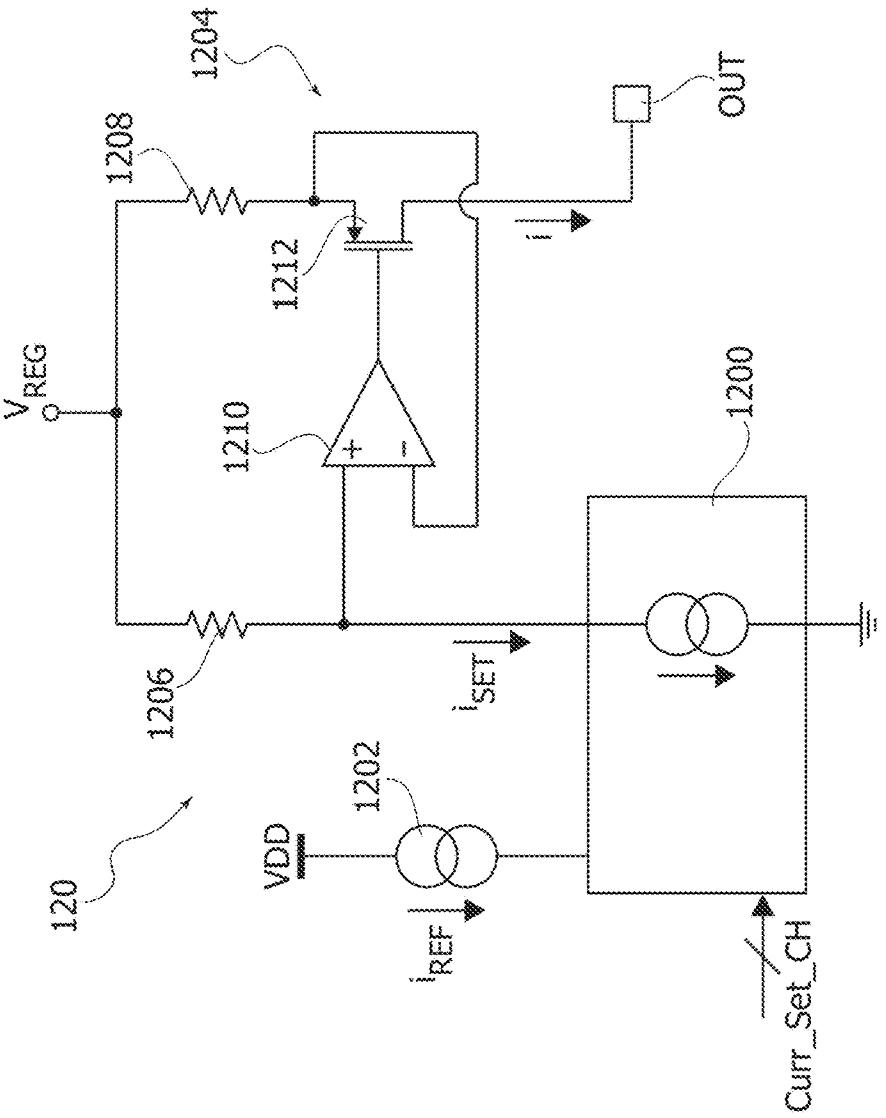
FIG. 4 shows an embodiment of a current source of the current supply circuit of FIG. 3.

FIG. 4 shows a possible implementation of the variable current source 120. Specifically, in the embodiment considered, the variable current source 120 comprises a Current Digital-to-Analog Converter (IDAC) 1200. As schematically shown in FIG. 4, in the embodiment considered, the IDAC 1200 is configured to receive a reference current $i_{REF}$, e.g., provided via a reference current source 1202, e.g., supplied via a DC supply voltage VDD, such as a voltage in a range between 3 and 5 V, and a digital signal Curr_Set_CH indicative of a multiplier c, wherein the multiplier c is an integer number. Moreover, the IDAC 1200 is configured to generate a current $i_{SET}$ corresponding to a multiple of the reference current $i_{REF}$ according to the multiplier c set via the signal Curr_Set_CH, i.e., $i_{SET}=c \cdot i_{REF}$. For example, in various embodiments, the signal Curr_Set_CH has 8 bits, which permits to set the current $i_{SET}$ in a range between 0 and $255 \cdot I_{REF}$. However, the signal Curr_Set_CH may also have less bits or more bits. For example, as well known in the art, such an IDAC may be implemented with a plurality of current mirrors having a different mirroring ratios, and wherein the current mirrors are selectively enabled as a function of the bits of the signal Curr_Set_CH.

In various embodiments, the current source 120 comprises a circuit 1204 for applying a scaled version of the current $i_{SET}$ to the respective output terminal OUT, i.e., $i=m \cdot i_{SET}$, wherein m represents a scaling factor. For example, in various embodiments, the circuit 1204 is implemented via a current mirror.

Conversely, in the embodiment shown in FIG. 4, the circuit 1204 comprises a first resistance 1206 connected between the voltage $V_{REG}$ and the output of the IDAC 1200. Accordingly, in the embodiment considered, the current $i_{SET}$ flows through the resistance 1206 and generates a voltage drop at the resistance 1206 being proportional to the current $i_{SET}$ and the resistance value of the resistance 1206.

Moreover, in the embodiment considered, the circuit 1204 comprises a second resistance 1208 connected with (the current path of) a Field-Effect Transistor (FET) 1212, such as a MOSFET, between the voltage $V_{REG}$ and the output terminal OUT. Accordingly, in the embodiment considered, the current i flows through the resistance 1208 and generates a voltage drop being proportional to the current i and the resistance value of the resistance 1208.

Finally, in the embodiment considered, the circuit 1204 comprises an operational amplifier (OpAmp) 1210 configured to drive the gate terminal of the FET 1212, such that the voltage drop at the resistance 1208 corresponds to the voltage drop at the resistance 1206. Accordingly, in the embodiment considered, the FET 1212 essentially acts as a variable current source.

For example, in various embodiments, the FET is a p-channel FET. In this case, a first terminal of the resistance 1208 is connected to the voltage $V_{REG}$, a source terminal of the p-channel FET 1212 is connected to a second terminal of the resistance 1208 and a drain terminal of the p-channel FET 1212 is connected to the output terminal OUT. Moreover, when using a p-channel FET, the positive/non-inverting input of the OpAmp 1210 is connected to the intermediate node between the resistance 1206 and the IDAC 1200, and the negative/inverting input of the OpAmp 1210 is connected to the intermediate node between the resistance 1208 and the FET 1212 (source terminal of the FET 1212), wherein the output terminal of the OpAmp 1210 is connected to the gate terminal of the p-channel FET 1212.

Accordingly, in the steady state condition, the voltage drop at the resistance 1208 corresponds to the voltage drop at the resistance 1206. Accordingly, in order to obtain a scaled current $i=m \cdot i_{SET}$, the resistance 1206 has a resistance value corresponding to the resistance value of the resistance 1208 multiplied by m. For example, when indicating the resistance value of the resistance 1208 as Rs, the resistance 1206 has a resistance value of m·Rs. For example, the scaling factor m may be selected in a range between 5 and 100, e.g., between 10 and 30, e.g., m=20. In various embodiments, the resistances 1206 and 1208 are matched resistances, which ensures that the resistances 1206 and 1208 are subject to the same process, voltage, and temperature (PVT) variations. For example, in various embodiments, resistances 1206 and 1208 are arranged in close proximity within the IC of the power supply circuit 1*a*.

Figure 5:
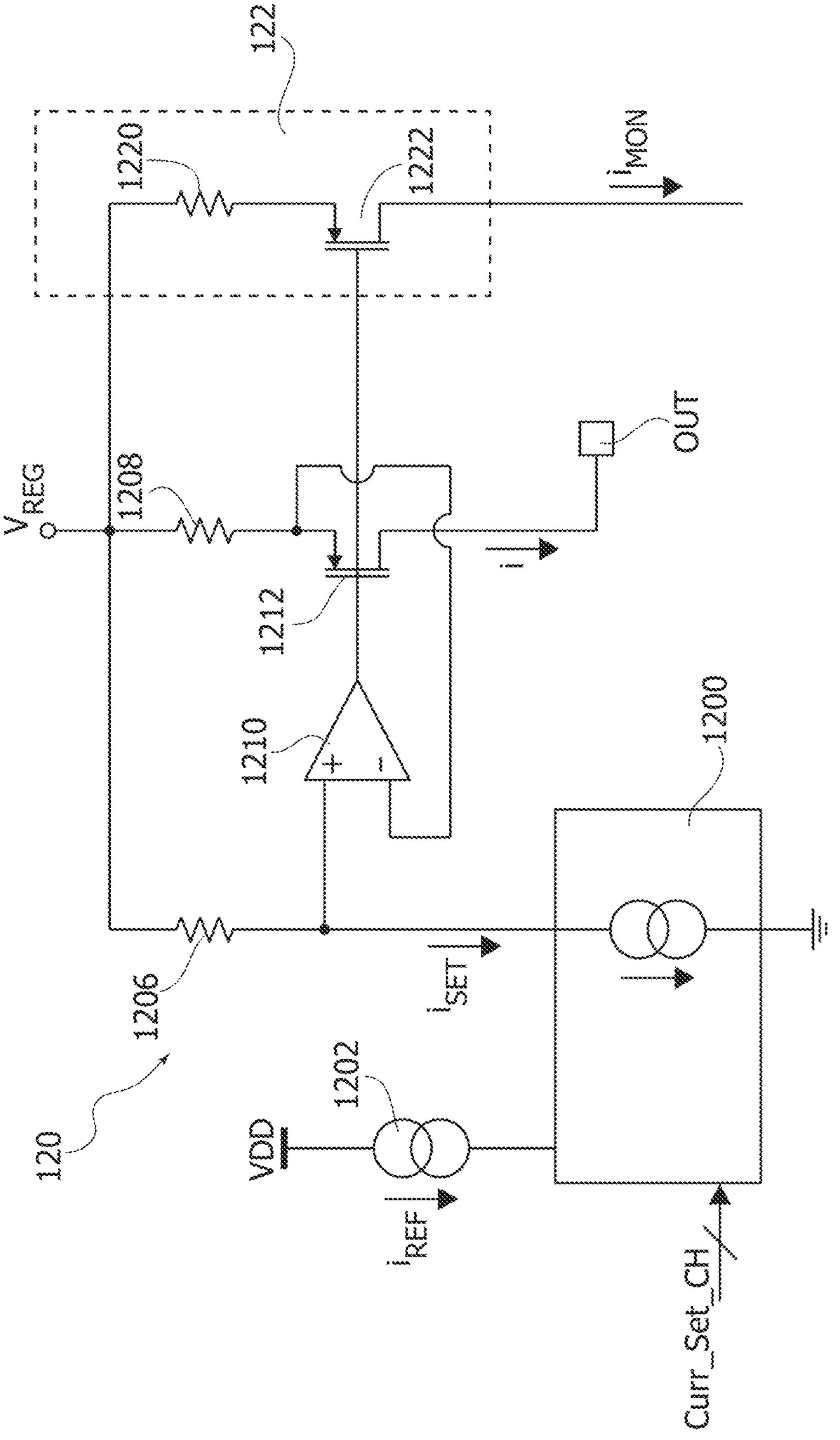
FIG. 5 shows an embodiment of a current sensor of the current supply circuit of FIG. 3.

FIG. 5 shows in this respect a possible implementation of the current sensor 122, when using the variable current source 120 described with respect to FIG. 4. Specifically, as described in the foregoing, the current i flows also through the FET 1212. Accordingly, in order to implement the current sensor 122, it is sufficient that the current supply circuit 12 comprises a further branch comprising a further resistance 1220 and a further FET 1222 of the same type (n-channel or p-channel) as the FET 1212, wherein the gate terminal of the FET 1222 is connected to the gate terminal of the FET 1212. For example, in the embodiment considered, the FET 1222 is a p-channel FET, wherein the source terminal of the FET 1222 is connected via the resistance 1220 to the voltage $V_{REG}$, the gate terminal of the FET 1222 is connected to the gate terminal of the FET 1212 and the drain terminal of the FET 1222 provides the measurement current $i_{MON}$.

Accordingly, in the embodiment considered, in order to obtain a scaled current $i_{MON}$=i/p, the resistance 1220 has a resistance value corresponding to the resistance value of the resistance 1208 multiplied by p, i.e., the resistance 1220 has a resistance value of p·Rs. Preferably, also the FET 1222 corresponds to a scaled version of the FET 1212, e.g., the FET 1222 has a width-to-length (W/L) ratio corresponding to the ratio W/L of the FET 1212 divided by the scaling factor p. In various embodiments, the resistances 1220 and 1208 are matched resistances, which ensures that the resistances 1220 and 1208 are subject to the same process, voltage, and temperature (PVT) variations. For example, in various embodiments, resistances 1206, 1208 and 1220 are arranged in close proximity within the IC of the power supply circuit 1*a*. As will be described in greater detail in the following, in various embodiments, the scaling factor p corresponds to the scaling factor m, i.e., p=m.

Similarly, when using a current mirror 1204, the current mirror 1204 may comprise an additional (output) branch providing the measurement current $i_{MON}$. For example, such a current mirror 1204 may be implemented with three p-channel FETs having their source terminals connected to the voltage $V_{REG}$, wherein the drain terminal of the first FET is connected to the output of the IDAC 1200, the drain terminal of the second FET provides the current i to the output OUT, the drain terminal of the third FET provides the measurement current $i_{MON}$, and the gate terminals of the three FETs are connected to the drain terminal of the first FET (output of the IDAC 1200). Specifically, in this case, the scaling factor m corresponds to the scaling between the second FET and the first FET, and the scaling factor p corresponds to the scaling between the third FET and the second FET, wherein also in this case, the scaling factors preferably correspond, i.e., p=m.

Figure 6:
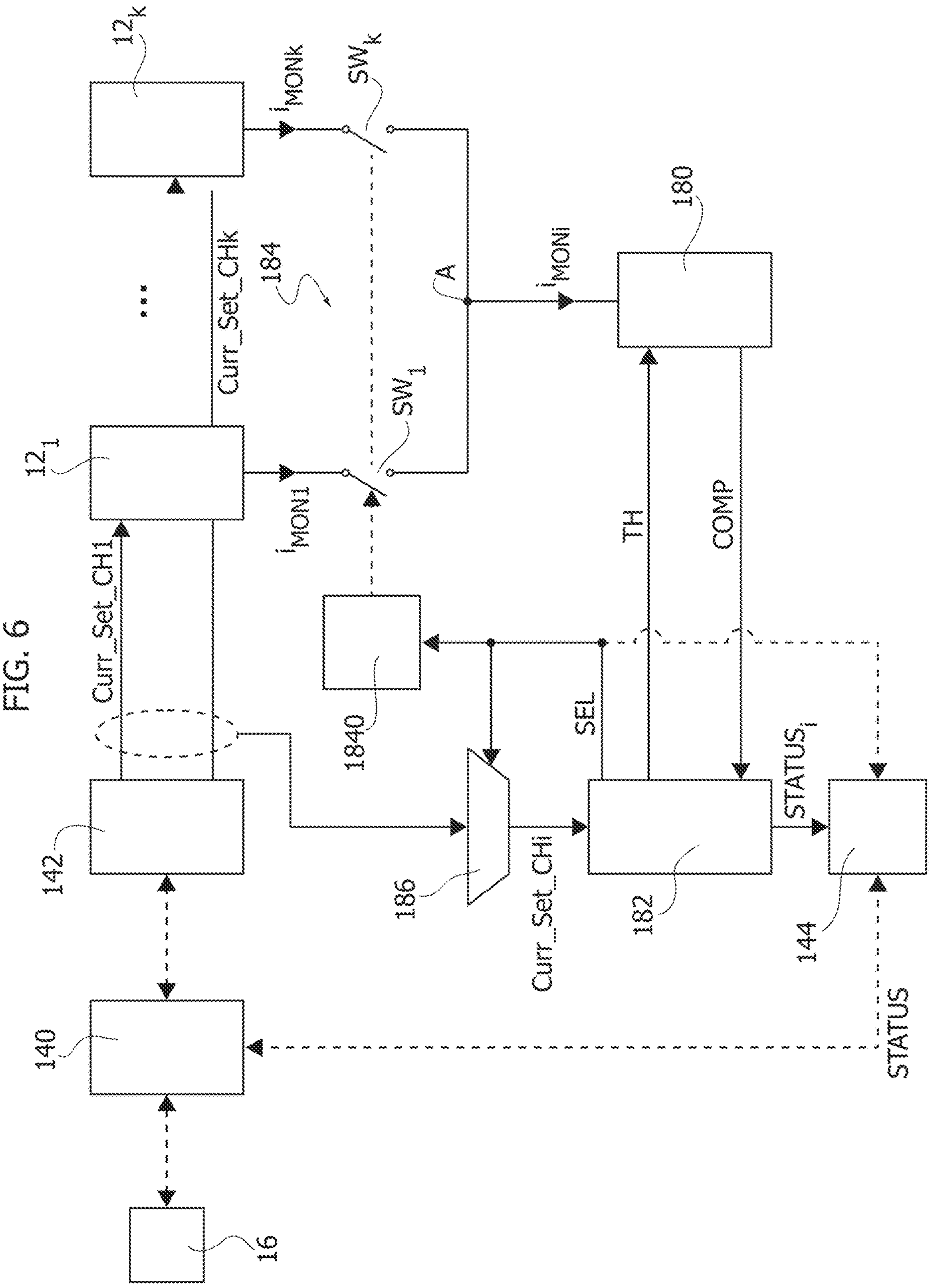
FIG. 6 shows an embodiment of a current monitoring circuit for the power supply circuit of FIG. 2.

FIG. 6 shows an embodiment of the current monitoring circuit 18. Specifically, as mentioned before, in various embodiments, the current monitoring circuit 18 is configured to determine whether the currents $i_l$ to $i_k$ are within given expected thresholds, wherein the values of the currents $i_l$ to $i_k$ are set via the respective signal Curr_Set_CH provided to each current supply circuit 12, which are indicated in the following as signals Curr_Set_CH1 to Curr_Set_CHk, e.g., the current supply circuit $\mathbf{12}_1$ sets the current i, based on the signal Curr_Set_CH1.

For example, in the embodiment considered, the control circuit 14 of the power supply circuit 1*a* comprises a plurality of registers 142 for storing the values of the signals Curr_Set_CH1 to Curr_Set_CHk.

As mentioned before, in various embodiments, the values of the signals Curr_Set_CH1 to Curr_Set_CHk may be programmed by the control circuit 14. For example, in FIG. 6 is shown a processing circuit 140 of the control circuit 14 configured to program/write the content of the registers 142. For example, as mentioned before, in various embodiments, the control circuit 14, e.g., the processing circuit 140, may receive the values of the signals Curr_Set_CH1 to Curr_Set_CHk via a communication interface 16. In general, any suitable communication protocol may be used for receiving programming commands via the communication interface 16, such as:

- a programming command comprising the value of one of the signals Curr_Set_CH1 to Curr_Set_CHk, e.g., comprising an address of the register 142 associated with a respective signal Curr_Set_CH1 to Curr_Set_CHk and the respective value for the signal Curr_Set_CH1 to Curr_Set_CHk; and/or
- a programming command comprising the values of all signals Curr_Set_CH1 to Curr_Set_CHk, e.g., comprising a data packet comprising in sequence the values for the signals Curr_Set_CH1 to Curr_Set_CHk; and/or
- a programming command comprising a subset of the values of the signals Curr_Set_CH1 to Curr_Set_CHk.

Additionally or alternatively, the processing circuit 140 may vary the values of the signals Curr_Set_CH1 to Curr_Set_CHk as a function of data provided by one or more sensors of the power supply circuit 1*a*, such as data indicative of the value of the voltage $V_{REG}$ and/or data indicative of the temperature of one or more components of the power supply system 1*a*, such as the temperatures of the current supply circuits 12.

In the embodiment considered, the current monitoring circuit 18 comprises a multiplexer 184 configured to generate a current $i_{MONi}$ by selecting one of the currents $i_{MON1}$ to $i_{MONk}$ as a function of a selection signal SEL generated by a (digital) control circuit 182 of the current monitoring circuit 18. For example, in the embodiment considered, the multiplexer 184 comprises k electronic switches $SW_1$ to $SW_k$, wherein each electronic switch $SW_1$ to $SW_k$ is connected between a respective current supply circuit and a node A. Accordingly, in this case each electronic switch $SW_1$ to $SW_k$ is configured to provide the respective current $i_{MON1}$ to $i_{MONk}$ to the node A when the electronic switch $SW_1$ to $SW_k$ is closed and the node A provides a current $i_{MONi}$ corresponding to the sum of the respective current $i_{MON1}$ to $i_{MONk}$ for which the respective electronic switch $SW_1$ to $SW_k$ is closed. Accordingly, in the embodiments considered, the multiplexer 184 may comprise a decoder 1840 configured to close one of the electronic switches $SW_1$ to $SW_k$ as a function of the selection signal SEL, whereby the node A provides a current $i_{MONi}$ corresponding to one of the current $i_{MON1}$ to $i_{MONk}$. Accordingly, in the embodiment considered, the selection signal SEL may be used to select one of the channels of the power supply circuit.

Accordingly, in various embodiments, the control circuit 182 is configured to generate the selection signal SEL in order to sequentially select the signals $i_{MON1}$ to $i_{MONk}$ (in any suitable order), and the current monitoring circuit 18 is configured to verify whether the selected current $i_{MONi}$ is within an expected value range, wherein the expected value range is determined as a function of the respective value Curr_Set_CH1 to Curr_Set_CHk associated with the selected current $i_{MON1}$ to $i_{MONk}$.

In general, the current monitoring circuit 18 could comprise an analog-to-digital converter (ADC) and the current monitoring circuit 18 could be configured to obtain a digital sample of the value of the selected current $i_{MONi}$ and verify whether the digital sample is within the expected value range determined as a function of the respective value Curr_Set_CH1 to Curr_Set_CHk. However, as mentioned before, also a significant number of currents $i_{MON1}$ to $i_{MONk}$ may be generated. Accordingly, performing an AD conversion may not be feasible in many application scenarios, wherein a fast detection of abnormal conditions is required. Accordingly, in order to increase the speed of the verification operation, the current monitoring circuit 18 could comprise a plurality of ADCs in order to sample in parallel a plurality of currents $i_{MON1}$ to $i_{MONk}$. However, such ADCs are complex, which would increase the dimension and cost of the power supply circuit.

Accordingly, in the following will be described a solution, wherein the current monitoring circuit 18 is configured to verify the value of the selected current $i_{MONi}$ in analog.

Specifically, in various embodiments, the selected current $i_{MONi}$ is provided to a current comparison circuit 180. The current comparison circuit 180 receives also one or more threshold control signals TH indicative of a comparison threshold $i_{TH}$ and is configured to generate a comparison signal COMP by comparing the selected current $i_{MONi}$ with the comparison threshold $i_{TH}$. For example, in various embodiments, the comparison circuit 180 is configured to assert, e.g., set to high, the comparison signal COMP when the current $i_{MON}$ is smaller than the comparison threshold $i_{TH}$, i.e., $i_{MONi}<i_{TH}$, and de-assert, e.g., set to low, the comparison signal COMP when the current $i_{MONi}$ is greater than the comparison threshold $i_{TH}$, i.e., $i_{MONi}>i_{TH}$.

In this respect, as described in the foregoing, in various embodiments, the current i provided by a current supply circuit corresponds to $i=m\cdot i_{SET}$, with $i_{SET}=C\cdot i_{REF}$, i.e.:

$$i = m\cdot c\cdot i_{REF} \tag{1}$$

wherein m is a constant scaling (or in general proportionality) factor of the variable current source 120 and the multiplier c is set via the signal Curr_Set_CH.

Moreover, the measurement current corresponds to $i_{MON}=i/p$, which may be reformulated according to equation (1):

$$i_{MON} = m/p\cdot c\cdot i_{REF} \tag{2}$$

where p is a constant scaling (or in general proportionality) factor of the current sensor 122, i.e., the ratio m/p is fixed. In this respect, by selecting a scaling factor p corresponding to the scaling facto m, i.e., p=m, equation (2) may be simplified as follows:

$$i_{MON} = c\cdot i_{REF} \tag{3}$$

Accordingly, equations (2) or (3) indicate the expected value $i_{MON,exp}$ for the current $i_{MON}$ for a given signal Curr_Set_CH. Equations (2) or (3) thus also apply to the expected value $i_{MONi,exp}$ for the selected current $i_{MONi}$, wherein the expected value $i_{MONi,exp}$ may be calculated based on the respective signal Curr_Set_CHi. For example, as shown in FIG. 6, the current monitoring circuit 18 may comprise a multiplexer 186 configured to generate the signal Curr_Set_CHi by selecting the signal Curr_Set_CH1 to Curr_Set_CHk associated with the selected channel/the selected current $i_{MONi}$.

Figure 7A:
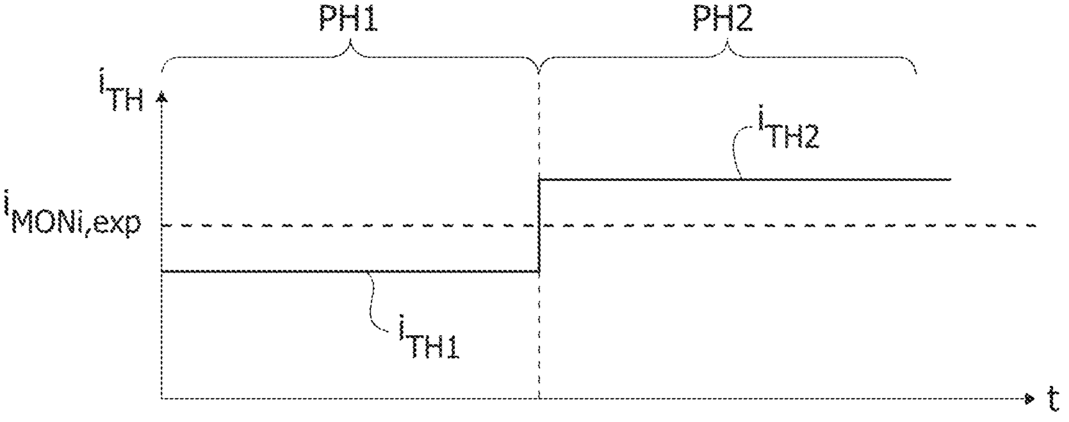
FIGS. 7A, 7B, 7C and 7D show embodiments of the operation of the current monitoring circuit of FIG. 6.

In this respect, as shown in FIG. 7A, in various embodiments, the control circuit 182 receives the signal Curr_Set_CHi and generates the one or more signals TH in order to:

- in a first phase PH1, set the comparison threshold $i_{TH}$ to a first value $i_{TH1}$ being smaller than the expected value $i_{MONi,exp}$ (as indicated by the signal Curr_Set_CHi) by a given first amount, e.g., $i_{TH1}=i_{MON,exp}-(x\cdot i_{MON,exp})$, where x indicates a tolerance range for the expected value $i_{MON,exp}$ and may be selected, e.g., in the range between 0.05 and 0.3, preferably between 0.1 and 0.25, e.g. x=0.20; and
- in a second phase PH2, set the comparison threshold $i_{TH}$ to a second value $i_{TH2}$ being greater than the expected value $i_{MONi,exp}$ (as indicated by the signal Curr_Set_CHi) by a given second amount, e.g., $i_{TH2}=i_{MON,exp}+(x\cdot i_{MON,exp})$.

In general, the sequence of phases may also be inverted. Moreover, instead of using a tolerance range, the first amount and the second amount may be fixed or predetermined, e.g., programmable via the communication interface 16. Similarly, in various embodiments, the tolerance value x may be programmable via the communication interface 16.

Figure 7B:
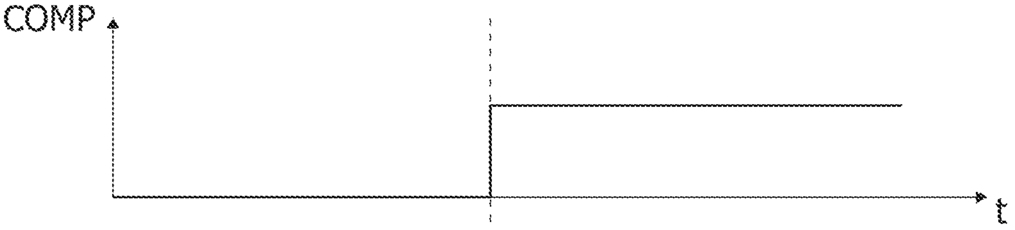

Accordingly, as shown in FIG. 7B, in various embodiments, when the monitored current $i_{MONi}$ has (approximately) the expected value $i_{MONi,exp}$, the comparison circuit 180 de-asserts the comparison signal COMP during the phase PH1, because the current $i_{MONi}$ is greater than the comparison threshold $i_{TH}$, i.e., $i_{MONi}>i_{TH1}$, and asserts the comparison signal COMP during the phase PH2, because the current $i_{MONi}$ is smaller than the comparison threshold $i_{TH}$, i.e., $i_{MONi}<i_{TH2}$.

Figure 7C:
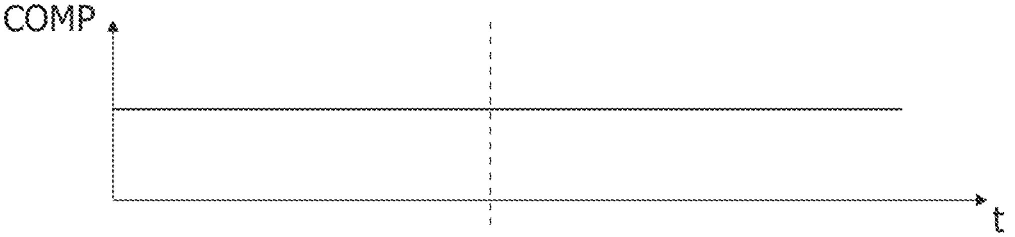

Conversely, as shown in FIG. 7C, in various embodiments, when the monitored current $i_{MONi}$ is (significantly) smaller than the expected value $i_{MONi,exp}$, the comparison circuit 180 asserts the comparison signal COMP both during the phase PH1 and the phase PH2, because the current $i_{MONi}$ is smaller than the comparison threshold $i_{TH}$, i.e., $i_{MONi}<i_{TH1}$ and $i_{MONi}<i_{TH2}$.

Figure 7D:
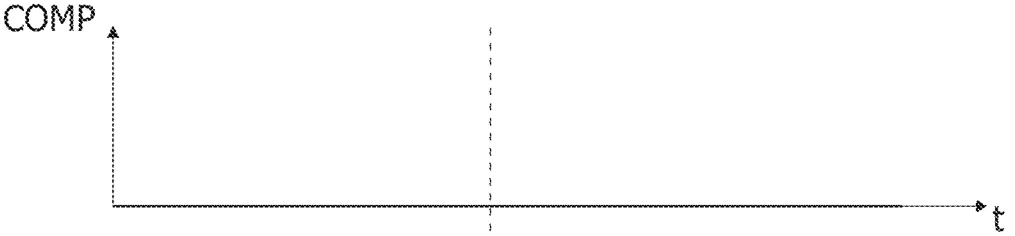

Conversely, as shown in FIG. 7D, in various embodiments, when the monitored current $i_{MONi}$ is (significantly) greater than the expected value $i_{MONi,exp}$, the comparison circuit 180 de-asserts the comparison signal COMP both during the phase PH1 and the phase PH2, because the current $i_{MONi}$ is greater than the comparison threshold $i_{TH}$, i.e., $i_{MONi}>i_{TH1}$ and $i_{MONi}>i_{TH2}$.

Accordingly, in various embodiments, the control circuit 182 generates the one or more threshold control signals TH in order to vary the threshold current $i_{TH}$ as indicated in the foregoing, and verifies whether the comparison signal COMP is de-asserted in the phase PH1 and asserted in the phase PH2. In this respect, in various embodiments, the control circuit 182 is configured to:

- assert, e.g., set to high, a status signal STATUSi, in response to determining that the comparison signal COMP is de-asserted in the phase PH1 and asserted in the phase PH2; and
- de-assert, e.g., set to low, the status signal STATUSi, in response to determining that the comparison signal COMP is asserted in the phase PH1 or de-asserted in the phase PH2.

In various embodiments, the same operation could be obtained by performing the comparison in parallel via two comparison circuits 180, wherein the first comparison circuit 180 is configured to compare the current $i_{MONi}$ with the threshold $i_{TH1}$, and the second comparison circuit 180 is configured to compare the current $i_{MONi}$ with the threshold $i_{TH2}$. However, in this case, the control circuit 182 generates in parallel two threshold signals TH, i.e., a first threshold signal TH for setting the current $i_{TH1}$ and a second threshold signal TH for setting the current $i_{TH2}$. In this respect, the solution shown in FIG. 6 requires just one comparison circuit 180 and has thus a reduced complexity and cost.

In various embodiments, the control circuit 14 of the power supply circuit 1*a* may comprise a register 144 and the value of the status signal STATUSi may be stored to a respective bit position associated with the channel selected via the selection signal SEL. For example, this is schematically shown in FIG. 6, wherein the selection signal SEL is used to select a bit position in the register 144 for storing the value of the status signal STATUSi. Accordingly, in the embodiment considered, the control circuit 182 may (e.g., periodically) scan all channels, whereby the register 144 provides a status signal STATUS indicating the status of all channels OUT1 to OUTk.

In this respect, in various embodiments, instead of scanning all channels, the control circuit 182 may sequentially select (via the selection signal SEL) only a subset of the channels.

For example, in various embodiments, the control circuit 182 may just select the channels for which the value of the signals Curr_Set_CH1 to Curr_Set_CHk is different from 0.

Alternatively, in various embodiments, the control circuit 14 may also comprise a register for storing channel enable flags, which indicate for each current supply circuit 12 whether the respective current source 120 should be enabled. Accordingly, in this case, the control circuit 182 may just select the channels for which the respective channel enable flag indicates that the respective current source 120 is enabled. For example, such channel enable flags may be stored to the register 142 and may be used to generate for each current supply circuit 12 a further control signal CTR indicating whether the respective current source 120 should be enabled. In various embodiments, the channel enable flags may be programmable via the communication interface 16.

Alternatively, in various embodiments, the control circuit 14 may also comprise a register for storing channel monitoring flags, which indicate for each channel whether the respective channel should be monitored. Accordingly, in this case, the control circuit 182 may just select the channels for which the respective channel monitoring flag indicates that the respective channel should be monitored. For example, such channel monitoring flags may be stored to the register 144. In various embodiments, the channel monitoring flags may be programmable via the communication interface 16.

In the following will now be described possible embodiments of the comparison circuit 180 and the respective generation of the one or more threshold control signals TH by the control circuit 182. As described in the foregoing, in various embodiments, the current comparison circuit 180 receives the selected current $i_{MONi}$ and one or more threshold control signals TH indicative of the comparison threshold $i_{TH}$ and is configured to generate a comparison signal COMP by comparing the selected current $i_{MONi}$ with the comparison threshold $i_{TH}$. Accordingly, in various embodiments, the comparison circuit 180 is configured to generate the comparison threshold $i_{TH}$ as a function of the one or more threshold control signals TH.

Figure 8:
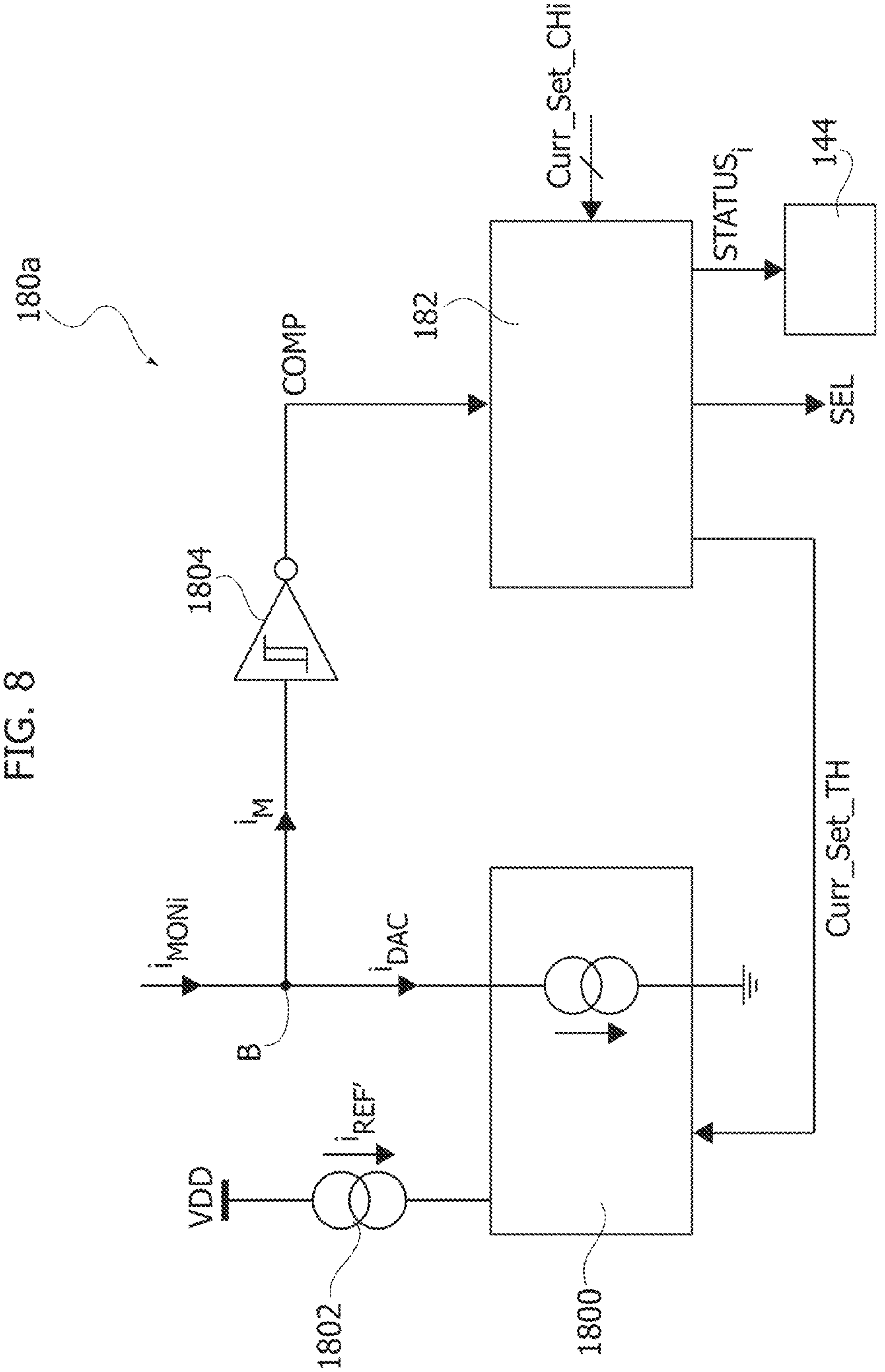
FIGS. 8, 9 and 10 show embodiments of comparison circuits of the current monitoring circuit of FIG. 6.

FIG. 8 shows a first embodiment of the comparison circuit 180, indicated as comparison circuit 180*a*, wherein the comparison circuit 180*a* comprises an IDAC 1800. As schematically shown in FIG. 8, in the embodiment considered, the IDAC 1800 is configured to receive a reference current $i_{REF}'$, e.g., provided via a reference current source 1802, e.g., supplied via the DC supply voltage VDD and a digital signal Curr_Set_TH indicative of a multiplier q, wherein the multiplier q is an integer number. Moreover, the IDAC 1800 is configured to generate a current $i_{DAC}$ corresponding to a multiple of the reference current $i_{REF}'$ according to the multiplier q set via the signal Curr_Set_TH, i.e., $i_{DAC}=q\cdot i_{REF}'$. For example, in various embodiments, the signal Curr_Set_TH has 8 bits, which permits to set the current $i_{DAC}$ in a range between 0 and $255\cdot i_{REF}'$.

Specifically, as described with respect to equation (2), the monitored current corresponds to $i_{MON}=m/p\cdot c\cdot i_{REF}$. Accordingly, in various embodiments, the reference current $i_{REF}'$ is selected as:

$$i'_{REF} = m/p\cdot i_{REF}. \tag{4}$$

For example, in various embodiments, the scaling factors m and p are designed such that m/p=1, i.e., the reference current $i_{REF}'$ corresponds to the reference current $i_{REF}$, i.e., $i_{REF}'=i_{REF}$.

Accordingly, in various embodiments, the IDAC 1800 provides the following current:

$$i_{DAC} = q\cdot m/p\cdot i_{REF}. \tag{5}$$

In fact, in this way, the IDAC 1800 is configured to provide a current $i_{DAC}$ corresponding to the expected current $i_{MONi,exp}$, i.e., $i_{DAC}=i_{MONi,exp}$, when the signal Curr_Set_TH corresponds to the signal Curr_Set_CHi of the currently selected channel, i.e., when q=c.

In the embodiment considered, the current $i_{MONi}$ is provided to a node B, and the IDAC 1800 is configured to sink the current $i_{DAC}$ from the node B, i.e., the node B provides a current $i_M=i_{MONi}-i_{DAC}$. Moreover, the node B is connected to a current comparator 1804, i.e., the current comparator 1804 receives the current $i_M$. Moreover, the current comparator 1804 is configured to:

- assert, e.g., set to high, the comparison signal COMP, when the current $i_M$ is smaller than zero;
- de-assert, e.g., set to low, the comparison signal COMP, when the current $i_M$ is greater than zero.

Thus, in the embodiments considered, the operation of the comparator 1804 is inverted with respect to a conventional current comparator, which is schematically shown via the inverting "dot" at the output of the comparator 1804.

Accordingly, in the embodiment considered, in order to generate the currents $i_{TH}=i_{TH1}$ and $i_{TH}=i_{TH2}$ described with respect to FIGS. 6 and 7, the control circuit 182 may be configured to:

- in the first phase PH1, set the value of the signal Curr_Set_TH to a first value Curr_Set_TH1 being smaller than the value Curr_Set_CHi (which indicates the expected value $i_{MONi,\,exp}$) by a given first amount, e.g., Curr_Set_TH1=Curr_Set_CHi−(x·Curr_Set_CHi), where x indicates the previously described tolerance range for the expected value $i_{MON,exp}$; and
- in the second phase PH2, set the value of the signal Curr_Set_TH to a second value Curr_Set_TH2 being greater than the value Curr_Set_CHi by a given second amount, e.g., Curr_Set_TH2=Curr_Set_CHi+(x·Curr_Set_CHi).

Figure 9:
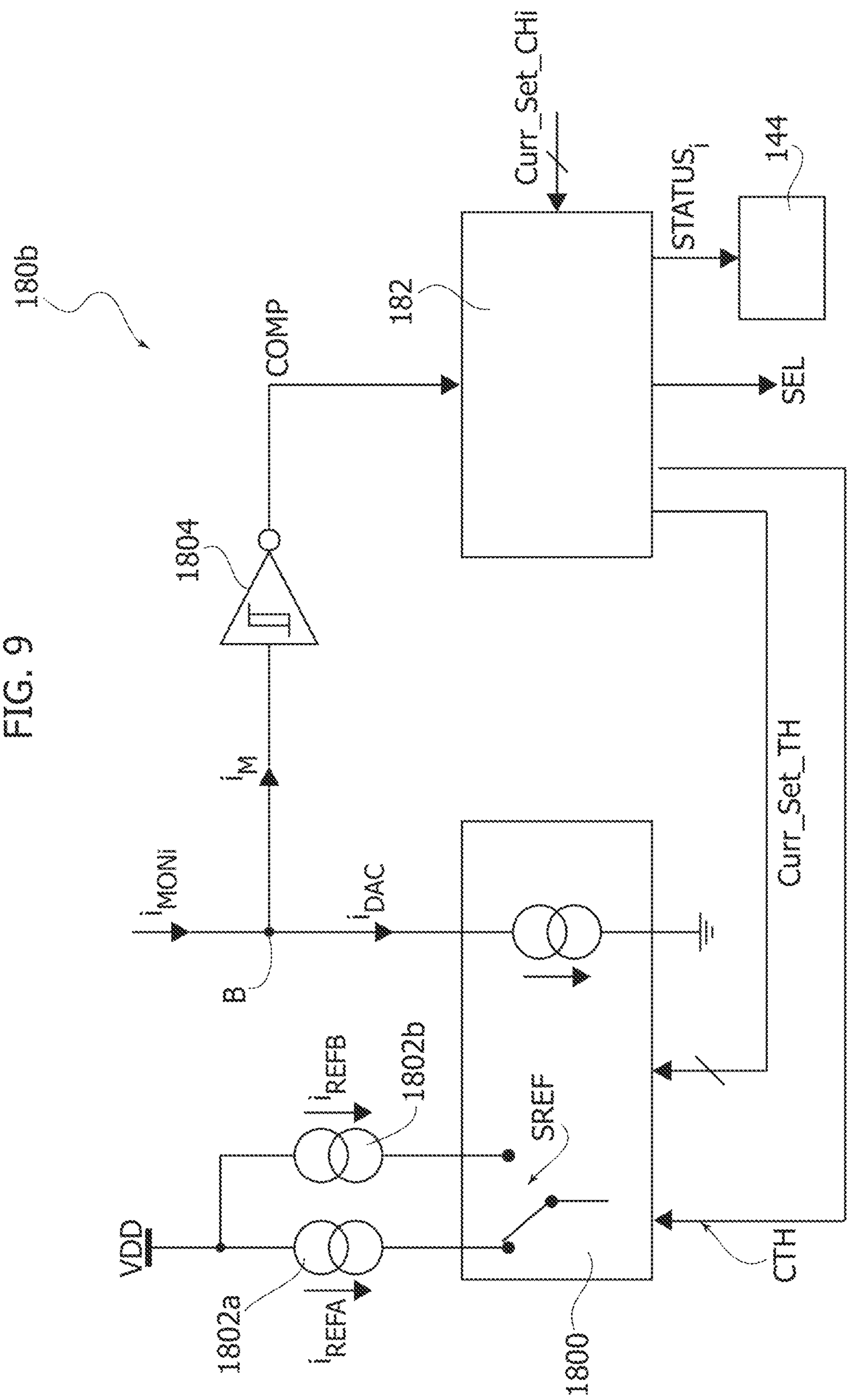

FIG. 9 shows a second embodiment of the comparison circuit 180, indicated as comparison circuit 180*b*. Specifically, in the embodiment considered, the control circuit 182 is configured to set, both during the first phase PH1 and the second phase, the value of the signal Curr_Set_TH to the value Curr_Set_CHi. Conversely, in order to generate the currents $i_{TH}=i_{TH1}$ and $i_{TH}=i_{TH2}$, the control circuit 182 may be configured to:

- in the first phase PH1, set the value of the reference current $i_{REF}'$ to a first value $i_{REFA}$ being smaller than the reference current $i_{REF}$ by a given first amount, e.g., $i_{REFA}=i_{REF}-(x \cdot i_{REF})$, where x indicates the previously described tolerance range for the expected value $i_{MON,exp}$; and in the second phase PH2, set the value of the reference current $i_{REF}'$ to a second value $i_{REFB}$ being greater than the reference current $i_{REF}$ by a given second amount, e.g., $i_{REFB}=i_{REF}+(x \cdot i_{REF})$.

As described with respect to equation (4), the current $i_{REF}$ may indeed be replaced with $m/p \cdot i_{REF}$ when the factor m does not correspond to the factor p.

For example, in order to vary the reference current $i_{REF}'$, the current comparison circuit 180*b* may comprise indeed two reference current sources 1802*a* and 1802*b* configured to generate the currents $i_{REFA}$ and $i_{REFB}$, respectively, and a switching circuit SERF configured to provide to the IDAC 1800 as reference current $i_{REF}$ either the current $i_{REFA}$ or the current $i_{REB}$ as a function of a selection signal CTH. According, in the embodiment considered, the control circuit 182 is configured to generate also the control signal CTH in order to:

in the first phase PH1, provide the reference current $i_{REFA}$ to the IDAC 1800, e.g., by setting the signal CTH to low; and in the second phase PH2, provide the reference current $i_{REFB}$ to the IDAC 1800, e.g., by setting the signal CTH to high.

Accordingly, in the embodiment shown in FIG. 9, the signals Curr_Set_TH and CTH represent the threshold control signals TH generated by the control circuit 182.

Figure 10:
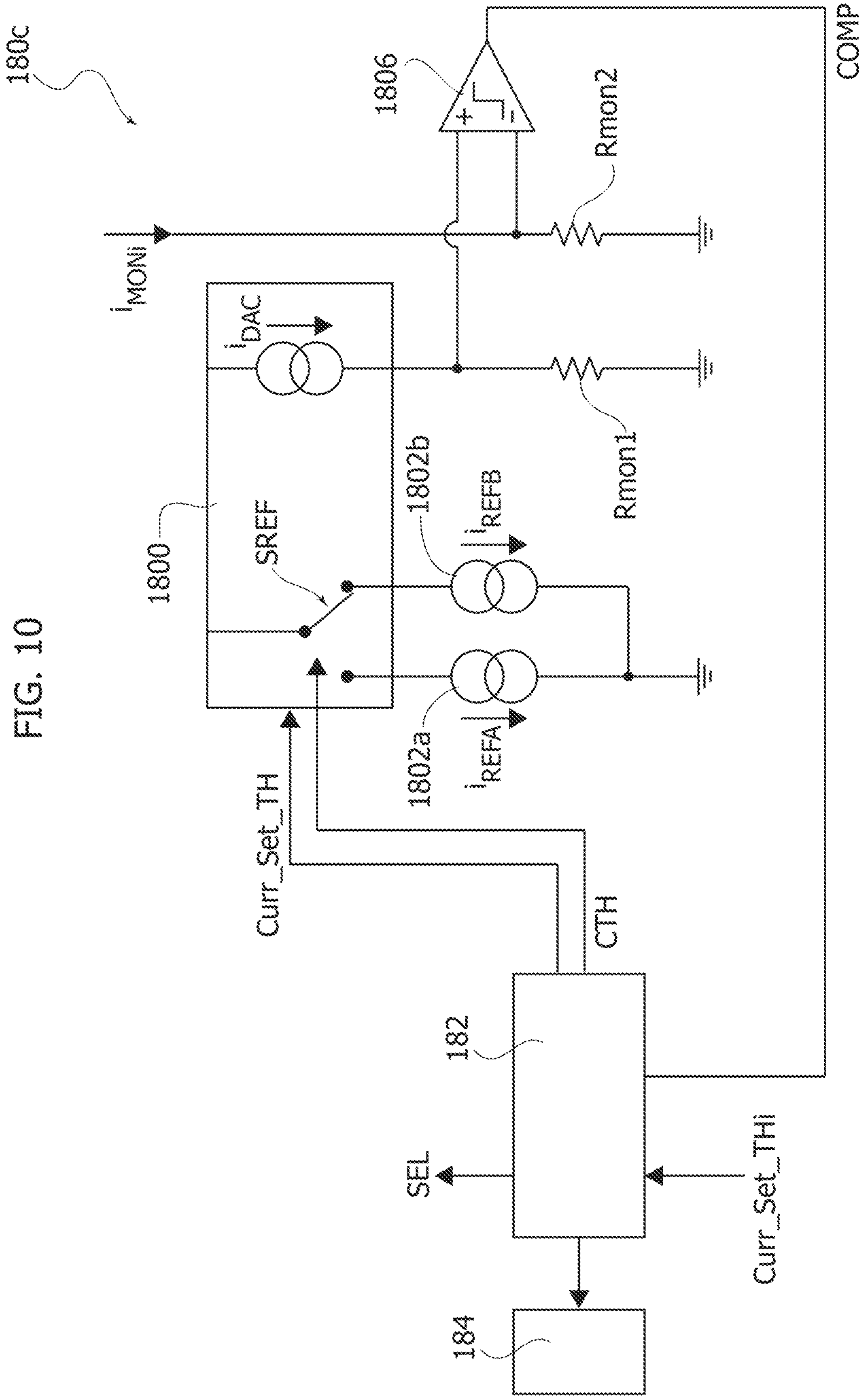

FIG. 10 shows a third embodiment of the comparison circuit 180, indicated as comparison circuit 180*c*. Specifically, in the embodiment considered, instead of using a current comparator 1804, the comparison circuit 180*c* comprises a voltage comparator 1806 configured to compare a first voltage with a second voltage.

Specifically, in the embodiment considered, the control circuit 182 and the IDAC 1800 are again configured to generate during the first phase PH1 a current $i_{DAC}=i_{TH1}$ and during the second phase PH2 a current $i_{DAC}=i_{TH2}$. For example, in FIG. 10 is used the solution described with respect to FIG. 9 (the digital input Curr_Set_TH remains unchanged and the reference current $i_{REF}'$ is changed), but also the solution of FIG. 8 may be used (the reference current $i_{REF}'$ remains unchanged and the digital input Curr_Set_TH is changed).

In the embodiment considered, the current monitoring circuit 180*c* comprises moreover two resistances Rmon1 and Rmon2, such as resistors, wherein the current $i_{DAC}$ flows through the resistance Rmon1, thereby generating a first voltage, and the current $i_{MONi}$ flows through the resistance Rmon2, thereby generating a second voltage. In the embodiment considered, the resistances Rmon1 and Rmon2 have the same resistance value and are preferably matched resistors. Accordingly, in the embodiment considered, the voltage comparator 1806 may receive at the positive input terminal the voltage (drop) at the resistance Rmon1 and at the negative input terminal the voltage (drop) at the resistance Rmon2, whereby the comparator 1806:

asserts, e.g., sets to high, the comparison signal COMP, when the current $i_{DAC}$ is greater than the voltage $i_{MONi}$ (which is usually the case during the second phase PH2).

de-asserts, e.g., sets to low, the comparison signal COMP, when the current $i_{DAC}$ is smaller than the voltage $i_{MONi}$ (which is usually the case during the first phase PH1).

As mentioned before, the measurement circuit 18 could also comprise two comparison circuits 180, which operate in parallel with respective threshold values. However, since the comparison circuits 180 shown in FIGS. 8, 9 and 10 comprises an IDAC 1800, the complexity of the measurement circuit 18 would be increased significantly.

Figure 11:
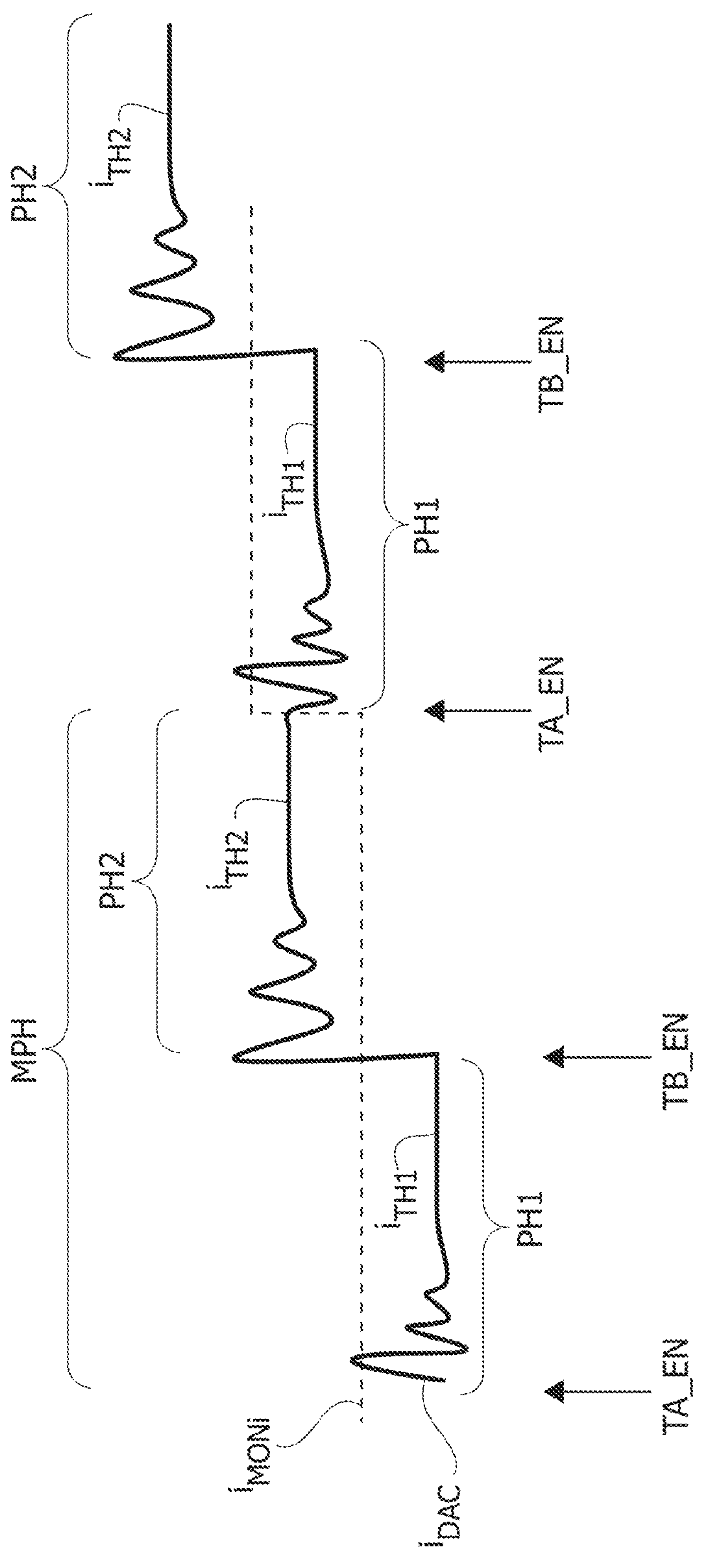
FIG. 11 shows a further embodiment of the operation of the current monitoring circuit of FIG. 6.

FIG. 11 shows an embodiment of the waveform of the current $i_{DAC}$ generated by the IDAC 1800. Specifically, in the embodiments described in the foregoing, the control circuit 182 receives the signal Curr_Set_CHi (indicative of the current $i_{MONi}$) and sets the one or more signals TH, such as the signal Curr_Set_TH and optionally the signal CTH, in order to set a first current $i_{TH1}$ during the first phase PH1 and a second current $i_{TH2}$ during the second phase PH2. For example, in various embodiments, the control circuit 182 comprises a timer circuit configured to generate one or more signals indicating the first phase PH1 and the second phase PH2, such as a first signal TA_EN indicating the start of a new first phase PH1 and a second signal TB_EN indicating the start of a new second phase PH2. For example, in various embodiments, the control circuit 182 is configured to:

in response to detecting that the signal TA_EN is asserted, set the one or more signals TH as a function of the value Curr_Set_CHi in order to generate a current $i_{DAC}$ corresponding to the value $i_{TH1}$; and in response to detecting that the signal TB_EN is asserted, set the one or more signal TH as a function of the value Curr_Set_CHi in order to generate a current $i_{DAC}$ corresponding to the value $i_{TH2}$.

Moreover, in various embodiments, the control circuit changes the selection signal SEL at the beginning of each measurement cycle MPH (comprising the phases PH1 and PH2), e.g., in response to detecting the start of a first phase PH1 or end of a second phase PH2.

However, as shown in FIG. 11, based on the implementation of the IDAC 1080, once the reference current $i_{REF}'$ or the digital input Curr_Set_TH is changed, the output $i_{DAC}$ may not be stable immediately, but a given time, such as few microseconds (μs), may be required until the output $i_{DAC}$ reaches the requested value, i.e., the current $i_{TH1}$ or $i_{TH2}$. Accordingly, in various embodiments, the control circuit 182 is configured to not sample the comparison signal COMP immediately, but after a given predetermined time (e.g., signals via a sampling request signal generated by the timer circuit of the control circuit 182). Alternatively, the control circuit 182 may sample the signal COMP at the end of the of the respective phase. Accordingly, in various embodiments, the control circuit 182 may be configured to sample the comparison signal COMP after a sampling time, for example being greater than 1 μs, e.g., selected in a range between 2 μs and 200 μs, e.g., between 5 μs and 50 μs, e.g., between 10 μs and 30 μs. Accordingly, in various embodiments, each phase may have a period having the same duration or a longer duration as the sampling time. For example, in various embodiments, the control circuit 182 is configured to:

in response to detecting an instant when the signal TB_EN becomes asserted, sample the signal COMP for the first phase PH1 (which should be de-asserted); and in response to detecting an instant when the signal TA_EN becomes asserted, sample the signal COMP for the second phase PH2 (which should be asserted);

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A power supply circuit comprising:

a plurality of output terminals;

a respective current supply circuit for each output terminal, wherein each current supply circuit is configured to provide an output current to the respective output terminal as a function of a respective first digital control signal, and wherein each current supply circuit comprises a current sensor configured to provide a measurement current proportional to the respective output current;

a first multiplexer circuit configured to provide a selected measurement current by selecting one of the measurement currents as a function of a selection signal indicating a selected current supply circuit;

a second multiplexer circuit configured to provide a selected digital control signal by selecting one of the first digital control signals as the function of the selection signal indicating the selected current supply circuit;

a comparison circuit configured to:

generate a threshold current as a function of one or more digital threshold control signals;

compare the selected measurement current with the threshold current;

in response to determining that the selected measurement current is greater than the threshold current, de-assert a comparison signal; and in response to determining that the selected measurement current is smaller than the threshold current, assert the comparison signal;

a control circuit configured to periodically repeat:

generate the selection signal in order to select the measurement current and a first digital control signal associated with a respective current supply circuit;

generate the one or more digital threshold control signals as a function of the selected digital control signal in order to:

during a first phase, set via the comparison circuit the threshold current to a first value, the first value being smaller than an expected value for the selected measurement current as indicated by the selected digital control signal; and during a second phase, set via the comparison circuit the threshold current to a second value, the second value being greater than the expected value for the selected measurement current as indicated by the selected digital control signal;

verify whether the comparison signal is de-asserted during the first phase and asserted during the second phase;

in response to determining that the comparison signal is de-asserted during the first phase and asserted during the second phase, assert a status signal; and in response to determining that the comparison signal is asserted during the first phase or de-asserted during the second phase, de-assert the status signal.

2. The power supply circuit according to claim 1, wherein each current supply circuit comprises:

a current digital-to-analog converter configured to receive a first reference current and the respective first digital control signal, wherein the first digital control signal is indicative of a first multiplier, and the current digital-to-analog converter is configured to generate a first current by multiplying the first reference current with the first multiplier; and a scaling circuit configured to generate the output current by generating an amplified version of the first current according to a first scaling factor.

3. The power supply circuit according to claim 2, wherein the scaling circuit of each current supply circuit comprises a first field-effect transistor (FET) connected between a regulated voltage and the respective output terminal; and wherein the current sensor of each current supply circuit comprises a second FET configured to provide the measurement current of the respective current supply circuit, wherein the second FET is a scaled version of the first FET according to a second scaling factor and the respective current supply circuit is configured such that a gate-source voltage of the second FET corresponds to the gate-source voltage of the first FET.

4. The power supply circuit according to claim 3, wherein a ratio between the first scaling factor and the second scaling factor is one.

5. The power supply circuit according to claim 3, wherein each current supply circuit comprises:

a first resistance connected between the regulated voltage and an output of the current digital-to-analog converter;

a second resistance connected with a current path of the first FET between the regulated voltage and the respective output terminal;

an operational amplifier configured to drive the gate-source voltage of the first FET such that a voltage-drop at the second resistance corresponds to a voltage-drop at the first resistance; and a third resistance connected in series with a current path of the second FET to the regulated voltage, wherein a gate terminal of the second FET is connected to a gate terminal of the first FET.

6. The power supply circuit according to claim 2, wherein the one or more digital threshold control signals comprise a second digital control signal, and wherein the comparison circuit comprises:

a further current digital-to-analog converter configured to receive a second reference current and the second digital control signal, wherein the second digital control signal is indicative of a second multiplier, and the further current digital-to-analog converter is configured to generate the threshold current by multiplying the second reference current with the second multiplier.

7. The power supply circuit according to claim 6, wherein the control circuit is configured to:

during the first phase, set the second digital control signal to a third value that is smaller than the selected digital control signal by a first percentage; and during the second phase, set the second digital control signal to a fourth value that is greater than the selected digital control signal by a second percentage.

8. The power supply circuit according to claim 6, wherein the one or more digital threshold control signals comprise a reference current selection signal, and wherein the control circuit is configured to:

during the first phase, set the second digital control signal to a value of the selected digital control signal and select via the reference current selection signal as the second reference current a first current value that is smaller than the first reference current by a first percentage; and during the second phase, set the second digital control signal to the value of the selected digital control signal and select via the reference current selection signal as the second reference current a second current value that is greater than the first reference current by a second tolerance percentage.

9. The power supply circuit according to claim 1, wherein the comparison circuit comprises:

a summation node configured to provide a current corresponding to a difference between the selected measurement current and the threshold current; and a current comparator configured to:

in response to determining that the current is greater than zero, de-assert the comparison signal; and in response to determining that the current is smaller than zero, assert the comparison signal.

10. The power supply circuit according to claim 1, wherein the comparison circuit comprises:

a first measurement resistance configured to be transversed by the threshold current;

a second measurement resistance configured to be transversed by the selected measurement current; and a voltage comparator configured to:

in response to determining that a voltage-drop at the first measurement resistance is greater than a voltage-drop at the second measurement resistance, assert the comparison signal; and in response to determining that the voltage-drop at the first measurement resistance is smaller than the voltage-drop at the second measurement resistance, de-assert the comparison signal.

11. A system comprising:

a power supply circuit comprising:

a plurality of output terminals;

a respective current supply circuit for each output terminal, wherein each current supply circuit is configured to provide an output current to the respective output terminal as a function of a respective first digital control signal, and wherein each current supply circuit comprises a current sensor configured to provide a measurement current proportional to the respective output current;

a first multiplexer circuit configured to provide a selected measurement current by selecting one of the measurement currents as a function of a selection signal indicating a selected current supply circuit;

a second multiplexer circuit configured to provide a selected digital control signal by selecting one of the first digital control signals as the function of the selection signal indicating the selected current supply circuit;

a comparison circuit configured to:

generate a threshold current as a function of one or more digital threshold control signals;

compare the selected measurement current with the threshold current;

in response to determining that the selected measurement current is greater than the threshold current, de-assert a comparison signal; and in response to determining that the selected measurement current is smaller than the threshold current, assert the comparison signal;

a control circuit configured to periodically repeat:

generate the selection signal in order to select the measurement current and a first digital control signal associated with a respective current supply circuit;

generate the one or more digital threshold control signals as a function of the selected digital control signal in order to:

during a first phase, set via the comparison circuit the threshold current to a first value, the first value being smaller than an expected value for the selected measurement current as indicated by the selected digital control signal; and during a second phase, set via the comparison circuit the threshold current to a second value, the second value being greater than the expected value for the selected measurement current as indicated by the selected digital control signal;

verify whether the comparison signal is de-asserted during the first phase and asserted during the second phase;

in response to determining that the comparison signal is de-asserted during the first phase and asserted during the second phase, assert a status signal; and in response to determining that the comparison signal is asserted during the first phase or de-asserted during the second phase, de-assert the status signal; and at least one load connected to the output terminals of the power supply circuit.

12. The system according to claim 11, wherein the at least one load is at least one lighting module.

13. The system according to claim 1, wherein each current supply circuit comprises:

a current digital-to-analog converter configured to receive a first reference current and the respective first digital control signal, wherein the first digital control signal is indicative of a first multiplier, and the current digital-to-analog converter is configured to generate a first current by multiplying the first reference current with the first multiplier; and a scaling circuit configured to generate the output current by generating an amplified version of the first current according to a first scaling factor.

14. A method of operating a power supply circuit, the method comprising:

generating first digital control signals;

providing output currents, by current supply circuits, in accordance with the first digital control signals;

generating, by a control circuit, a selection signal in order to select via a first multiplexer circuit a measurement current, and via a second multiplexer circuit one of the first digital control signals associated with a respective current supply circuit;

generating, by the control circuit, one or more digital threshold control signals as a function of the selected digital control signal in order to:

during a first phase, setting, by the control circuit via a comparison circuit, a threshold current to a first value, the first value being smaller than an expected value for the selected measurement current as indicated by the selected digital control signal; and during a second phase, setting, by the control circuit via the comparison circuit, the threshold current to a second value, the second value being greater than the expected value for the selected measurement current as indicated by the selected digital control signal;

receiving a comparison signal from the comparison circuit and verifying whether the comparison signal is de-asserted during the first phase and asserted during the second phase;

in response to determining that the comparison signal is de-asserted during the first phase and asserted during the second phase, asserting a status signal; and in response to determining that the comparison signal is asserted during the first phase or de-asserted during the second phase, de-asserting the status signal.

15. The method according to claim 14, further comprising:

receiving, by a current digital-to-analog converter of each current supply circuit, a first reference current and the respective first digital control signal, the respective first digital control signal being indicative of a first multiplier;

generating, by the current digital-to-analog converter, a first current by multiplying the first reference current with the first multiplier; and generating, by a scaling circuit of each current supply circuit, the output current by generating an amplified version of the first current according to a first scaling factor.

16. The method according to claim 15, wherein the one or more digital threshold control signals comprise a second digital control signal indicative of a second multiplier, and the method further comprises:

receiving, by a further current digital-to-analog converter of the comparison circuit, a second reference current and the second digital control signal; and generating, by the further current digital-to-analog converter, the threshold current by multiplying the second reference current with the second multiplier.

17. The method according to claim 16, further comprising:

during the first phase, setting, by the control circuit, the second digital control signal to a third value that is smaller than the selected digital control signal by a first percentage; and during the second phase, setting, by the control circuit, the second digital control signal to a fourth value that is greater than the selected digital control signal by a second percentage.

18. The method according to claim 16, wherein the one or more digital threshold control signals comprise a reference current selection signal, and the method further comprises:

during the first phase, setting, by the control circuit, the second digital control signal to a value of the selected digital control signal, and selecting, by the control circuit, via the reference current selection signal as the second reference current a first current value that is smaller than the first reference current by a first percentage; and during the second phase, setting, by the control circuit, the second digital control signal to the value of the selected digital control signal, and selecting, by the control circuit, via the reference current selection signal as the second reference current a second current value that is greater than the first reference current by a second tolerance percentage.

19. The method according to claim 14, wherein the comparison circuit comprises:

providing, by a summation node of the comparison circuit, a current corresponding to a difference between the selected measurement current and the threshold current;

in response to determining that the current is greater than zero, de-asserting, by a current comparator, the comparison signal; and in response to determining that the current is smaller than zero, assert, by the current comparator, the comparison signal.

20. The method according to claim 14, wherein the method further comprises:

transversing, by the threshold current, a first measurement resistance of the comparison circuit;

transversing, by the selected measurement current, a second measurement resistance of the comparison circuit;

in response to determining that a voltage-drop at the first measurement resistance is greater than a voltage-drop at the second measurement resistance, asserting, by a voltage comparator of the comparison circuit, the comparison signal; and in response to determining that the voltage-drop at the first measurement resistance is smaller than the voltage-drop at the second measurement resistance, deassertting, by the voltage comparator of the comparison circuit, the comparison signal.

* * * * *